United States Patent
Hunter

[11] 3,916,295
[45] Oct. 28, 1975

[54] FERRORESONANT VOLTAGE REGULATOR STABILIZED FOR LIGHT LOAD CONDITIONS
[75] Inventor: Patrick L. Hunter, Columbus, Ohio
[73] Assignee: North Electric Company, Galion, Ohio
[22] Filed: July 15, 1974
[21] Appl. No.: 488,751

[52] U.S. Cl. .................. 323/50; 323/56; 323/61; 323/86
[51] Int. Cl.² .................. G05F 1/38; G05F 1/64
[58] Field of Search ........ 323/6, 22 SC, 24, 48, 50, 323/56, 57, 60, 61, 62, 86–88

[56] References Cited
UNITED STATES PATENTS
3,739,257   6/1973   Hunter ............................ 323/60 X
3,778,699   12/1973   Hoffman ......................... 323/60 X

*Primary Examiner*—Gerald Goldberg
*Attorney, Agent, or Firm*—Johnson, Dienner, Emrich & Wagner

[57] ABSTRACT

A thyristor controlled ferroresonant voltage regulator in which the output voltage is made adjustable by varying the reset flux level of each of two parallel magnetic core paths upon which the load windings are wound. To improve the stability at light load or low voltage adjust conditions, a small value of inductance is added, preferably by an inductor between the common cathode connection of the thyristors and the junction of a pair of windings in the two saturating core paths. During one half cycle of the output waveform one thyristor is enabled by an associated control circuit to complete a circuit path for the resonant capacitor through the small inductance and a winding on the second magnetic core path which is driven into saturation, while the flux in the first magnetic core path is clamped; in the second half cycle, the other thyristor is enabled at a time determined by the control circuit, to complete a circuit path for the capacitor through the small inductance and a winding on the first magnetic core path which is driven into saturation while the flux in the first magnetic core path is clamped.

13 Claims, 11 Drawing Figures

FERRORESONANT VOLTAGE REGULATOR STABILIZED FOR LIGHT LOAD CONDITIONS

BACKGROUND OF THE INVENTION

This invention relates to ferroresonant voltage regulating circuits, and particularly to circuits of such type which have an adjustable output voltage or closed feedback loops.

Ferroresonant regulators presently find widespread use in the power supply field. Among the many advantages of such type regulator is the fact that it is a regulating transformer circuit which provides voltage isolation and allows setting of the output voltage level. In addition, such type of regulator is reliable, of relatively low cost, simple in structure and of small size, provides excellent voltage regulation with static and dynamic input line voltage changes, has inherent short circuit protection, has good efficiency and input power factors, has output characteristics which protect rectifiers, requires a smaller filter than for other types of sources, and has multiple output capability. Summarily the ferroresonant regulator power supply is the simplest, lowest cost, and most reliable power supply available today for producing large amounts of regulated DC or AC power from an AC source.

Ferroresonant voltage regulators basically include a linear inductor, a saturating inductor, more commonly called a saturating reactor, and a capacitor. The linear inductor is in series with the input line to the voltage regulator and the saturating reactor shunts the output. The capacitor, often called a ferroresonating capacitor, or more simply a ferrocapacitor, shunts the saturating reactor and is usually tuned near resonance with the linear inductor. Both the linear inductor and the saturating reactor may be wound on a single transformer core with the reactor may and output electrically isolated, in which case, the input winding is on a non-saturating portion of the transformer core and output winding is on a saturating portion. In each half cycle of AC input the saturating core saturates, and the impedance of the saturating winding drops. The capacitor resonates with the low, saturated inductance to quickly discharge the saturating winding and recharge in the opposite polarity. The core thereupon drops out of saturation so that further ringing does not occur. The AC output, which may be rectified to provide DC output, is taken from across the ferrocapacitor. When the ferrocapacitor voltage reverses, therefore, the output voltage reverses and the output half cycle is terminated. A saturating core, however, requires a fixed volt-time area of its saturating winding characteristic in order to saturate. Consequently, when the input voltage increases or decreases, the core saturates earlier or later in the immediate half cycle, but the volt-time product of each half cycle of output voltage is constant. When the input frequency is constant, therefore, providing a constant steady state volt-time average per output half cycle, the output voltage must be constant. As a result, changes in input voltage have little effect on output voltage and regulation against changes in input voltage is obtained thereby.

For a given design, it is well known that the output voltage is directly proportional to the source frequency since the volt-time area across the core is held constant. It is also well known that the output voltage changes with temperature because the saturation flux density is temperature dependent. Also, the impedances in he load winding and load circuit cause changes in the output voltage when the load current is changed. Manufacturing tolerances in the transformer circuit and tolerances in the saturation flux density of the magnetic core material cause changes in the output voltage for a fixed design. There is no convenient way of adjusting the output voltage or controlling the output voltage to correct for variables once the design has been made.

Many methods have been applied in an attempt to provide some degree of adjust or control in the ferroresonant regulator field. Some prior methods are mentioned in my U.S. Pat. No. 3,739,257 issued June 12, 1973 and assigned to North Electric Company, Galion, Ohio. That patent also discloses an arrangement havng simplified adjustment or control type capabilities, and which further has improved output regulating characteristics. The structure comprises a single transformer or magnet component having two separate saturating core portions both decoupled from the source by separate magnetic shunt means, with the ferroresonant capacitor coupled across windings on both of the saturating portions. The circuit is thyristor controlled with a separate thyristor across the winding or each saturating core portion, one thyristor being enabled by a control circuit during the first half cycle to connect the capacitor in series with the other saturating core portion to resonately discharge and reverse charge the capacitor, and the other thyristor is selectively enabled during the other half cycle. The patent discloses a thyristor controlled ferroresonant voltage regulator circuit in which the output voltage is made adjustable by varying the reset level of each of two parallel magnetic core paths upon which the load windings are wound. One magnetic core path is driven hard into magnetic saturation during one half cycle of the output waveform, and the second magnetic core path is clamped at a given value; in the second half cycle the second path is driven into magnetic saturation and the one path is clamped at the given value. The level of clamping is determined by an associated control circuit which may comprise a simple manually adjustable potential source, or a circuit with load sensing and automatic feedback capabilities.

The ferrocapacitor is discharged at the end of each half cycle of the output voltage and recharged in the opposite polarity. The characteristics of the resonant discharge and recharge is determined by the shape of the B-H characteristic. For high quality grain-oriented silicon steel, the magnetic saturation region is very flat requiring a large magnetizing force to change the flux a small amount. This results in a very low impedance across the windings on the two saturating core portions when the core enters the saturation region. The resultant discharge current in the ferroresonant capacitor has a very high peak value and short duration.

SUMMARY OF THE INVENTION

An object of the circuit of this invention is to provide a ferroresonant regulator with improved stability at light load or no load.

According to this invention, each of the two switching devices has a small inductor in series therewith connected respectively across the windings on the two saturating core portions. When one switching means is enabled during a half cycle, it connects the small inductor in series between the ferroresonant capacitor and the winding on the other saturating core portions. While this small inductance may be inserted in the circuit on either side of the switching device, in the preferred embodiment which uses thyristors as switches, the small inductor is provided in the capacitor discharge circuit between the common cathode connection and the junction point connecting the windings on the two saturating core portions.

The advantage of adding this small inductance is that the resonant discharge is much softer causing slower rates of change of output voltage during the resonant discharge. This improves no-load stability, particularly at high input and low output voltage adjust conditions, and permits operating the circuit at lower adjust values on the output down to zero load.

DETAILED DESCRIPTION

The invention is incorporated in a circuit of the type described in my U.S. Pat. No. 3,739,257 issued June 12, 1973 for a Variable Flux Reset Ferroresonant Voltage Regulator, which is incorporated herein and made a part hereof as though fully set forth, and hereinafter referred to as the reference patent.

Figure 1:
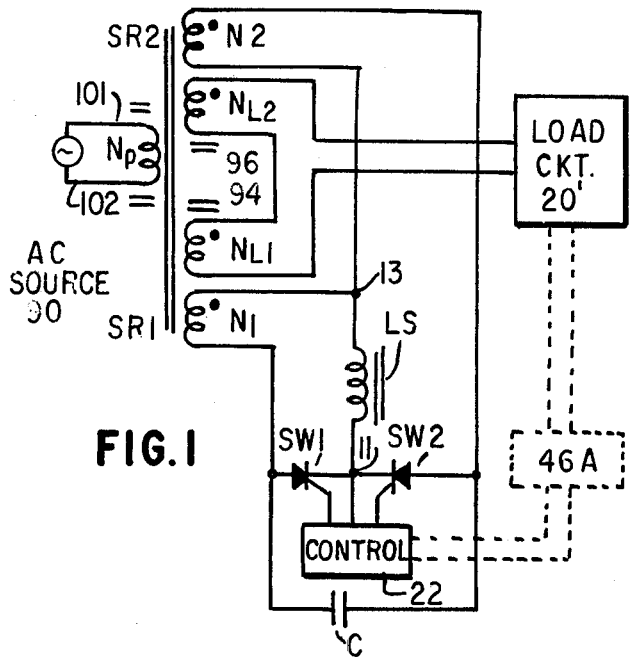
FIG. 1 is a schematic showing a circuit including a regulator structure as used in U.S. Pat. No. 3,739,257, with an inductor added to the circuit according to the inventive concept.
Figure 2:
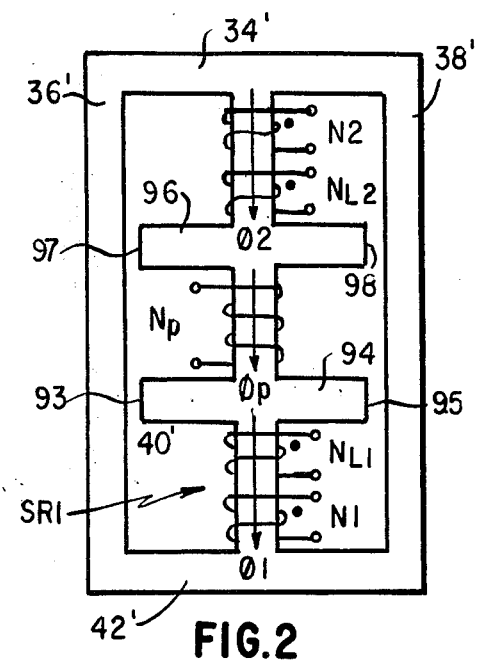
FIG. 2. shows the core structure and windings of the circuit of FIG. 1.

The invention may be incorporated in any of the embodiments shown in the reference patent, and as an illustrative embodiment, FIGS. 1 and 2 herein correspond respectively to FIGS. 13 and 14 of the reference patent.

With reference to FIG. 2, such regulator is shown to comprise a one piece transformer structure comprising a three legged core of stacked iron laminations. In the illustrated embodiment, conventional E configuration laminations are disposed to provide an upper transverse leg 34', vertical side legs 36', 38' and a vertical center leg 40'. I-shaped laminations are disposed to abut and span the one end of the E shaped laminations so as to provide lower transverse leg 42'. The E-I laminations are interleaved in known manner to form the illustrated structure.

Magnetic shunts 94, 96 are located in spaced relationship on the center vertical leg 40' with the ends thereof located in spaced adjacent relation to vertical legs 36', 38' to provide air gaps 93, 95 and 97, 98 respectively.

A single primary winding $N_P$ is wound on the central portion of center leg 40' between the shunts 94, 96 and as shown in FIG. 1 is connected across an AC source 90 by conductors 101, 102. A secondary coil structure consisting of capacitor winding $N_1$ and a load winding $N_{L1}$ are wound on the lower portion of center leg 40' between the lower transverse leg 42' and magnetic shunt 94, the magnetic shunt 94 thereby providing a loose coupling between primary winding $N_P$ and the secondary windings $N_1$, $N_{L1}$. A second capacitor winding $N_2$ and a second load winding $N_{L2}$ are wound on the upper portion of the center leg 40' between the magnetic shunt 96 and the upper transverse leg 34', the shunt 96 providing a loose coupling between secondary windings $N_2$, $N_{L2}$ and the primary winding $N_P$.

With reference to FIG. 1, the load windings $N_{L1}$, $N_{L2}$ are connected in series to load circuit 20 and the capacitor windings $N_1$, $N_2$ are connected in series across resonating capacitor C. Thyristors SW1 and SW2 are connected across capacitor windings $N_1$ and $N_2$. Control circuit 22 (and a feedback circuit 46A if desired) are connected to control the thyristors SW1 and SW2.

Figure 3A:
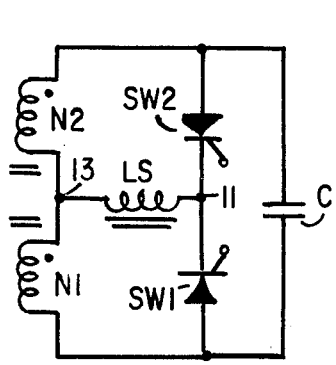
FIGS. 3A, 3B, and 3C show different embodiments for connecting the inductor in the circuit.
Figure 3B:
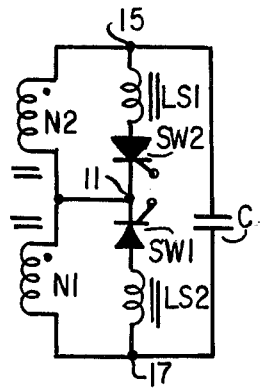
Figure 3C:
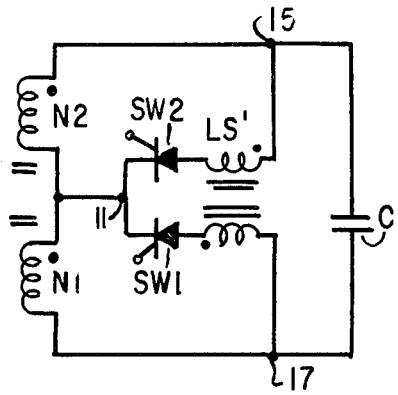

For the purpose of improving the stability at light load conditions, inductor Ls has been added connected between the common cathode connection 11 of thyristors SW1 and SW2 and the junction 13 of windings $N_1$ and $N_2$. It should be understood that the inductor can be added in any of the embodiments shown in the reference patent. Various connections are shown in FIGS. 3A–3C. The connection shown in FIG. 3A corresponds to that shown in FIG. 1. In FIG. 3B, a first inductor LS1 is connected between the anode of thyristor SW2 and one end 15 of winding $N_2$, and a second inductor LS2 is connected between the anode of thyristor SW1 and one end 17 of winding $N_1$. The second end of windings $N_1$ and $N_2$ are connected to the cathodes of thyristors SW1 and SW2. The connection of FIG. 3C is similar to FIG. 3B, except that inductor Ls comprises two windings wound on a common core. Any of the connections of FIGS. 3A–3C can be used with any of the embodiments of the reference patent. The configuration in FIG. 3A is preferred since the inductor Ls is of a smaller size in such embodiment resulting in a lower cost and simpler circuit.

OPERATION

The operation will be described first for the case of Ls equal to zero, as is the case of the structure shown in the reference patent.

The magnetic circuit of the arrangement shown in FIGS. 1 and 2 consists of two magnetic paths through which flux $\phi_1$ and $\phi_2$ can flow independently of each other and independent of the primary flux $\phi_p$. Essentially this means that there are three independent flux paths. In this case $\phi_p$ is established by the source voltage $v_s$ and is given by $$\phi_p = (1/N_p) \int v_s dt \times 10^8$$

Flux values $\phi_1$ and $\phi_2$ are controlled by the secondary circuit which consists of the resonant capacitor C, thyristors SW1, SW2 and the associated control circuit 22, and capacitor windings $N_1$ and $N_2$. The difference flux values $\phi_p - \phi_1$ and $\phi_p - \phi_2$ are forced to flow over the magnetic shunts 94, 96.

With the thyristors SW1 and SW2 in a nonconducting state, the regulator circuit functions in a manner similar to a conventional ferroresonant regulator, wherein the secondary windings, such as $N_{L1}$, $N_{L2}$, of two ferroresonant transformer circuits are connected in series. The flux-density values $B_1$ and $B_2$ ($\phi 1/A$ or $\phi 2/A$) vary over the limits shown in FIG. 15 of the reference patent of $-B_{1s}$ to $+B_{1s}$ for core SR1 and $-B_{2s}$ to $+B_{2s}$ for core SR2.

The resultant output voltage is proportional to the sum of the flux-density changes $2B_{1s}$ and $2B_{2s}$ in each core. Each core is driven hard into magnetic saturation once in each half-cycle. By controlling the interval of firing of thyristor SW1 and SW2 in each half cycle the flux changes in each core can be varied.

It is initially assumed that at some time in the half-cycle of the output waveform, when the dotted terminals are positive, both thyristors SW1, SW2 are nonconducting, and that the flux-density in each core portions SR1, SR2 is increasing in a positive direction. When the flux-density in core portion SR2 reaches the value $+B_{2R}$, thyristor SW 2 is gated into conduction which effectively short circuits winding $N_2$ and clamps the flux density at that value. No further flux change in core portion $SR_2$ is possible while thyristor SW2 is conducting; however, the flux-density in core portion $SR_1$ is increasing toward positive saturation and a maximum value $+B_{1s}$.

When the core portion SR1 enters the saturation region, the resonant capacitor C discharges through the circuit path consisting of thyristor SW2 and winding $N_1$, due to the low saturation inductance of winding $N_1$. The voltage of capacitor C thereupon reverses polarity and charges to a large negative voltage. When the current in thyristor SW2 goes to zero, it becomes nonconducting. The flux-density in core portion SR2, as a result, starts to change in a negative direction.

At some later time in the negative half-cycle thyristor SW1 is gated into conduction, which effectively short circuits winding $N_1$ and clamps the flux-density at a value $-B_{1R}$. The flux-density in core region $SR_2$ continues to change toward negative saturation and a maximum value $-B_{2s}$. When core portion $SR_2$ enters the saturation region, the resonant capacitor C discharges through the circuit path consisting of thrysistor SW1 and winding $N_2$ due to low saturation inductance of winding $N_2$. The voltage of capacitor C reverses polarity and charges to a large positive voltage. When the current in thyristor SW1 goes to zero, thyristor SW1 becomes nonconducting. A complete cycle has now been completed.

The total load voltage $V_L$ and the resonant capacitor voltage $V_c$ are waveforms identical to the conventional ferroresonant regulator waveforms.

The resonant capacitor C and thyristor circuit including thyristors SW1, SW2 are shown directly coupled in the embodiment shown in FIG. 1. However, as shown in FIG. 16 of the reference patent, the resonant capacitor C may be inductively coupled to the thyristors SW1, SW2. Control of the firing of thyristors can be acheived with any of the modes shown in the reference patent.

Figure 4:
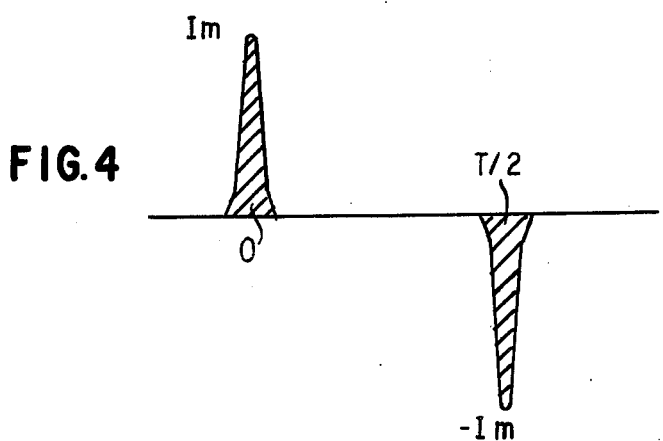
FIG. 4 is a graph showing current in the ferroresonant capacitor at a light load condition.

In the circuit as described above, the capacitor C is discharged at the end of each half-cycle of the output voltage and recharged in the opposite polarity. The characteristics of the resonant discharge and recharge is determined by the shape of the B-H characteristic shown in FIG. 15 of the reference patent. For high quality grain-oriented silicon steel, the magnetic saturation region is very flat requiring a large magnetizing force to change the flux a small amount. This results in a very low impedance across windings $N_1$ and $N_2$ when the core enters the saturation region. The resultant discharge current in capacitor C has a very high peak value and short duration as shown in FIG. 4. This causes the voltage waveform to be very square and results in stability problems at light loads. Usually a minimum load is required to stabilize the circuit.

OPERATION WITH INDUCTOR Ls

Figure 5:
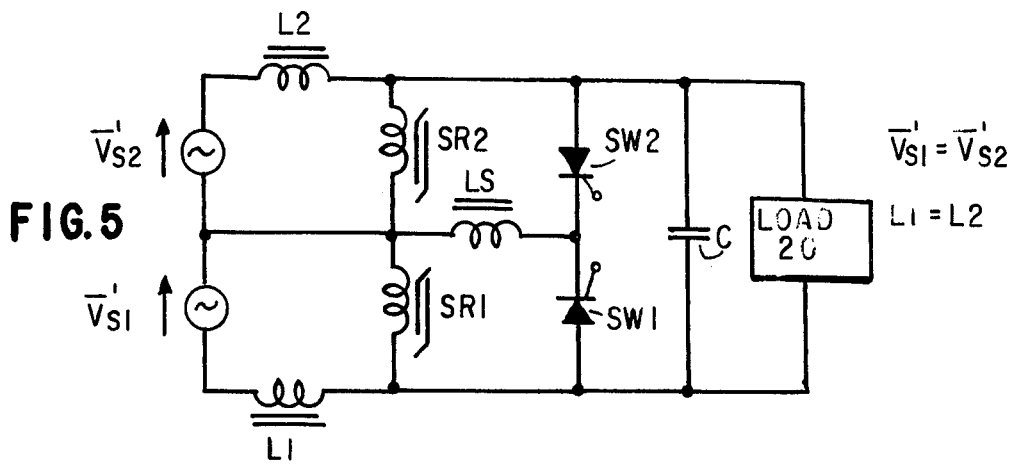
FIG. 5 is a diagram showing an equivalent circuit of the structure of FIGS. 1 and 2.
Figure 6:
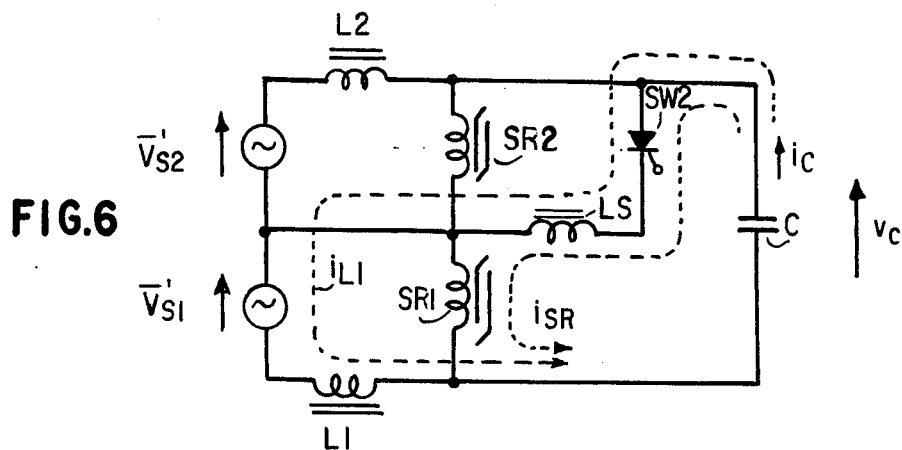
FIG. 6 is a schematic diagram of a portion of the equivalent circuit showing current paths for the ferrocapacitor.

By adding inductor Ls as shown in FIG. 1, there is introduced two effects which improve stability, (1) the effective slope of the eqivalent saturation region is increased by Ls, and (2) the decoupling inductance between the AC source and secondary circuit becomes effective in assisting the resonant discharge. In a simple form, the circuit of FIG. 1 can be represented by the equivalent circuit shown in FIG. 5. If it is assumed that thyristor SW2 is conducting and SW1 is turned off, the capacitor C is discharged by current flow as indicated by the dashed lines in FIG. 6.

Figure 7:
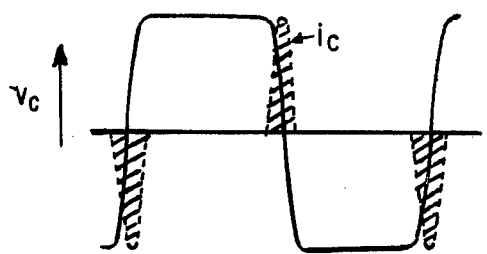
FIGS. 7 and 8 are waveform diagrams for the ferrocapacitor voltage and current under light load conditions respectively, with and without the inductor according to the invention.

For Ls = 0, the current component $i_{SR}$ is as indicated above, i.e., high peak value and short duration. The thyristor SW2 conducts very close to the end of the half cycle of output voltage. The current component $i_{L1}$ has little effect on the discharge. The resultant capacitor current and voltage are shown in FIG. 7.

Figure 8:
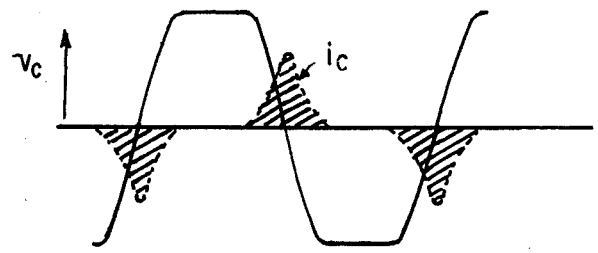
Figure 9:
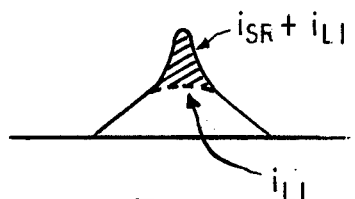
FIG. 9 is a diagram of the current waveform of FIG. 8 expanded to show the components thereof.

By adding the inductor Ls to the circuit, the effective impedance seen by the resonant capacitor is much larger, requiring more time to discharge the capacitor. The resultant capacitor current and voltage are shown in FIG. 8. The increased discharge time permits the current component $i_{L1}$ to be effective in assisting the resonant discharge. Normally L1 is very large compared to Ls. This accounts for the lower slope at the leading and trailing edges of $i_{SR} + i_{L1}$ as shown in FIG. 9. In FIG. 9 the shaded area indicates the current component $i_{SR}$. When core SR1 saturates the current component $i_{SR}$ increases as shown. The amplitude and direction is determined by the saturating characteristics of SR1 and the inductance value of Ls.

By adding a small value of Ls relative to L1 and L2 the resonant discharge is much softer, causing a slower rate of change of output voltage during the resonant discharge. This improves the no-load stability, particularly at high input and low output voltage adjust conditions. This permits operating the circuit at lower adjust values on the output down to zero load.

In a typical embodiment of the regulator shown in FIG. 1, for a nominal full load rating of voltage of 514 volts and current of 19.8 amperes, the primary inductance (L1 and L2 in FIG. 5) has a nominal value of 20 millihenries, the inductance of inductor Ls is 1.8 millihenries, and the capacitor C has a value of 135 microfarads. The thyristors SW1 and SW2 may be type C147, available from General Electric Company.

In FIG. 3B, each of the inductors LS1 and LS2 require a value of 1.8 millihenries to be equivalent to the value given above for inductor Ls. In FIG. 3C, each of the windings of inductor Ls would have a value of 1.8 millihenries.

ADDENDUM

As noted above, the inductor Ls may be added to any of the embodiments shown in the reference patent. Each of these embodiments have a core section for the primary windings and two separate secondary core sections, each of which has a thyristor switch connected across a winding thereon. The small inductance Ls may be added with any of the arrangements shown in FIGS.

3A–3C. In each case the inductance is effectively inserted in series with each of the thyristors across one of the capacitor windings of one of the secondary core sections.

While what is described is regarded to be a preferred embodiment of the invention, it will be apparent that variations, rearrangements, modifications and changes may be made therein without departing from the scope of the present invention as defined by the appended claims.

I claim:

1. A regulator device comprising a transformer structure having magnetic core means which has at least a first and second magnetic path, primary winding means wound on said magnetic core means including means for connecting said primary winding means to an alternating current source, secondary winding means on said magnetic core means including load winding means for providing an output voltage to a load which is proportional to the rate of change of flux in said first and second magnetic paths, means for decoupling said source from said load winding means, a first core winding for said first magnetic path and a second core winding for said second magnetic path, capacitor means coupled across said first and second core windings, inductance means for altering the slope at the half cycle boundaries of the output voltage waveform, and switching means operative at a selected time in a first half cycle of the load voltage to connect the inductance of said inductance means across said first core winding, and operative at a selected time in a second half cycle of the load voltage to connect the inductance of the said inducatnce means across said second core winding, to effect resonant discharge and reverse charging of said capacitor in each half cycle.

2. A regulator device as set forth in claim 1, wherein the impedance of said inductance means is small compared to the effective primary inductance.

3. A regulator device as set forth in claim 1, wherein said switching means comprises first and second thyristors, each having anode, cathode, and gate electrodes, means connecting the anode electrodes of said first and second thyristors respectively to one end of said first and second core windings, and in which said inductance means comprises an inductor connected between the cathode electrodes of said first and second thyristors and the other ends of said first and second core windings.

4. A regulator device as set forth in claim 3, wherein said capacitor means is a capacitor connected directly between said anode electrodes.

5. A regulator device as set forth in claim 1, wherein said switching means comprises first and second thyristors, each having anode, cathode and gate electrodes, means connecting the cathode electrodes of said first and second thyristors to one end of each of said first and second core windings, and in which said inductance means comprises first and second inductor windings connected respectively between the anode electrodes of said second and first thyristors and the other ends of said second and first core windings.

6. A regulator device as set forth in claim 5, wherein said first and second inductor windings are wound on separate cores.

7. A regulator device as set forth in claim 5, wherein said first and second inductor windings are wound on the same core.

8. In a regulator device comprising a transformer structure having a magnetic core which has a center leg over which first and second magnetic paths are established, primary windings means wound on said center leg of the magnetic core including means for connecting said primary winding to an alternating current source, secondary winding means including load winding means wound on said center leg of said core for providing an output voltage proportional to the rate of change of flux in said first and second paths, a first core winding wound on said center leg for said first magnetic path and a second core winding wound on said center leg for said second magnetic path, magnetic shunt means for decoupling said source from said secondary windings, capacitor means coupled across said first and second core windings, switching means including a first switch means in a first path coupled across said first core winding to control current conduction from said capacitor over the second core path to drive said second magnetic core path into hard magnetic saturation and to substantially clamp the flux in said first magnetic core path at a selected level which varies with and is determined by the time in a first half cycle of the output voltage at which said fifst switch means is enabled, and a second switch means in a second path coupled across said second winding to control current conduction from said capacitor over said first core path and to substantially clamp the flux level in said second core path at a selected level which is determined by and varies with the time in a second half cycle of the output voltage at which said second switch means is enabled, and control means for selectively enabling said first and second switch means in alternate half cycles;

inductor means for altering the slope of the half cycle boundaries of the output voltage waveform, said inductor means connected in series with said first switch means in said first path and in series with said second switch means in said second path, to thereby add impedance for said current conduction from said capacitor in each half cycle after the switching means is enabled.

9. A regulator device as set forth in claim 8, wherein the impedance of said inductance means is small compared to the effective primary inductance.

10. A regulator device as set forth in claim 8, wherein said switch means comprises first and second thyristors, each having anode, cathode, and gate electrodes, means connecting the anode electrodes of said first and second thyristors respectively to one end of said first and second core windings;

and in which said inductance means comprises an inductor connected between the cathode electrodes of said first and second thyristors and the other ends of said first and second core windings.

11. A regulator device as set forth in claim 8, wherein said switch means comprises first and second thyristors, each having anode, cathode and gate electrodes, means connecting the cathode electrodes of said first and second thyristors to one end of each of said first and second core windings, and in which said inductance means comprises first and second inductor windings connected respectively between the anode electrodes of said second and first thyristors and the other ends of said second and first core windings.

12. A regulator device as set forth in claim 11, wherein said first and second inductor windings are wound on separate cores.

13. A regulator device as set forth in claim 11, wherein said first and said second inductor windings are wound on the same core.

* * * * *